S. JENCICK.
FLEXIBLE SHAFT AND UNIVERSAL COUPLING THEREFOR.
APPLICATION FILED JUNE 17, 1916.

1,283,787.

Patented Nov. 5, 1918.
2 SHEETS—SHEET 1.

Inventor.
Stephen Jencick
by Brockett & Hyde
Attys.

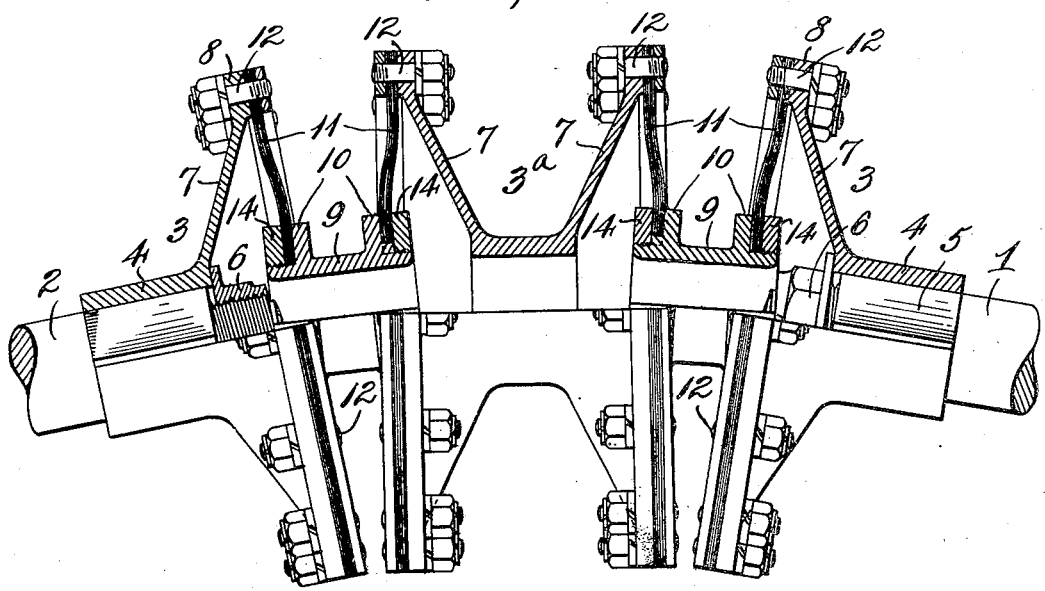
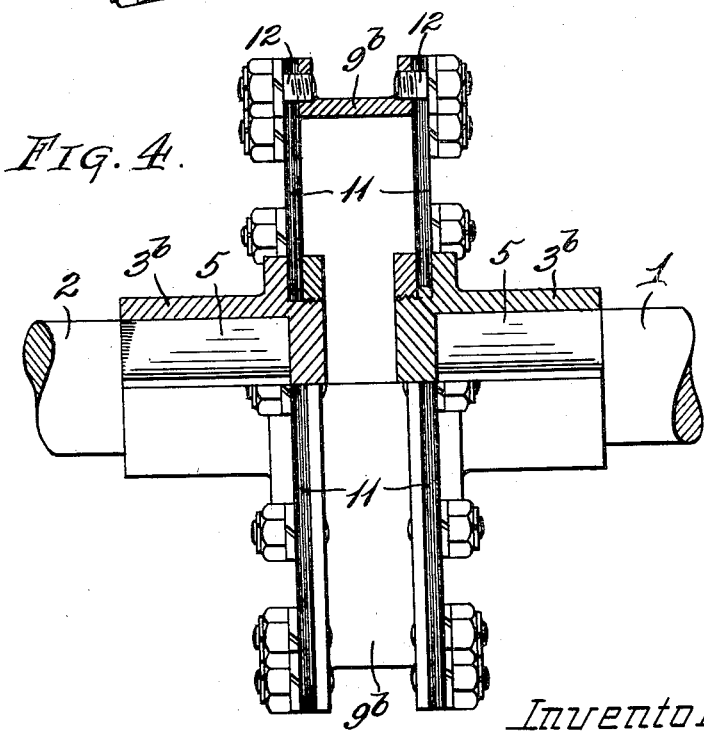

UNITED STATES PATENT OFFICE.

STEPHEN JENCICK, OF CLEVELAND, OHIO, ASSIGNOR TO GUSTAVUS A. SCHANZE.

FLEXIBLE SHAFT AND UNIVERSAL COUPLING THEREFOR.

1,283,787.  Specification of Letters Patent.  Patented Nov. 5, 1918.

Application filed June 17, 1916. Serial No. 104,253.

*To all whom it may concern:*

Be it known that I, STEPHEN JENCICK, a subject of the Emperor of Austria, residing at Cleveland, in the county of Cuyahoga and State of Ohio, have invented certain new and useful Improvements in Flexible Shafts and Universal Couplings Therefor, of which the following is a specification.

This invention relates to flexible shafts and universal couplings therefor.

The object of the invention is to provide a simple form of coupling for connecting two shaft sections arranged end to end but which may be slightly out of alinement with each other, or for permitting relative movement, within certain limits, between said two shaft sections, said movement being either relative longitudinal movement or a movement which varies the angular relation of the axes of the shafts. A further object of the invention is to provide a shaft coupling which can be used in multiple form as a flexible shaft, and which, moreover, is of simple form, can be manufactured at low cost and is not liable to get out of order, whose parts can be readily replaced at low cost when worn or injured, and which avoid the necessity of lubrication.

Further objects of the invention are in part obvious and in part will appear more in detail hereinafter.

The invention comprises the construction and arrangement of parts hereinafter described and claimed.

Figure 1:
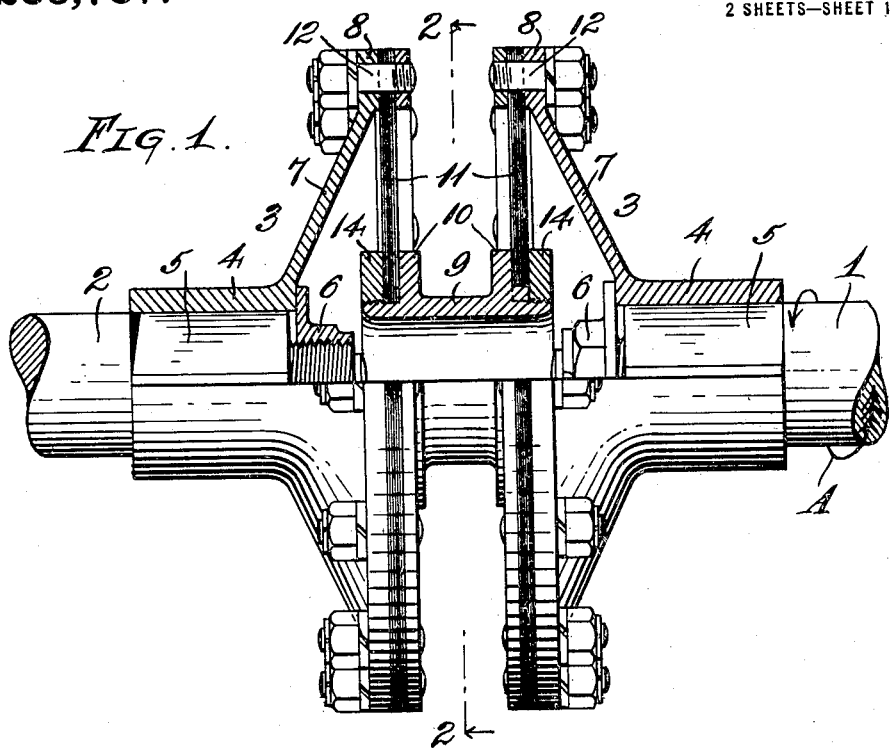
Figure 2:
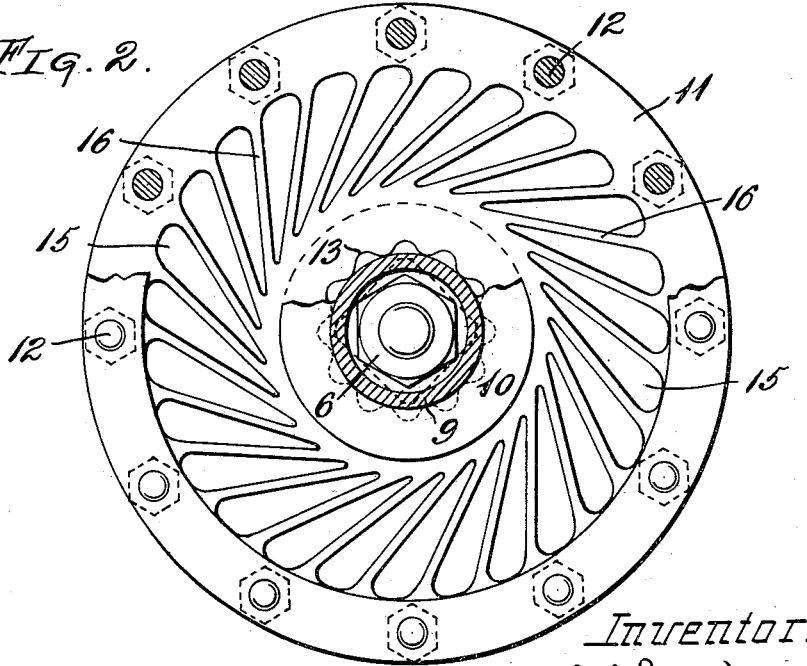

In the drawings Figure 1 represents a view half in side elevation and half in longitudinal section, through one form of device embodying the invention; Fig. 2 is a cross section, partly broken out, on the line 2—2 Fig. 1, looking in the direction of the arrows; Fig. 3 is a longitudinal section through a flexible shaft embodying the invention; and Fig. 4 is a view corresponding to Fig. 1 and illustrating a modified form of the invention.

Referring to the drawings 1 indicates the driving shaft which may be assumed to rotate in the direction of the arrow A for turning the driven shaft 2, said two shaft members being connected by the coupling about to be described.

Said coupling comprises two similar body members 3 provided with sleeve portions 4 surrounding the ends of the shaft sections and arranged to rotate therewith, being splined, keyed or otherwise connected thereto, such as by a squared opening receiving two squared portions 5 of the shaft, as shown. Said sleeves are held on the shaft sections by the nuts 6. They are also provided with outwardly extending shallow saucerlike portions 7, shown as conical, whose outer edges are provided with a circumferential transversely disposed flange 8. The two cones face each other and inclose a hollow space between the ends of the shaft sections in which is located a coupling member 9, which may be a solid body but is shown as a hollow cylinder provided with two transverse flanges 10. This coupling member is connected to the two body portions 3 by like flexible members 11. Each of said members consists of a series of thin metal sheets or laminations of disk form piled upon each other. The outer portions of said members are secured rigidly to the flanges 8 of the body portions 3 in any suitable manner, such as by clamping bolts 12, while their central portions are cut out and slid over the ends of the coupling member 9, preferably being serrated or toothed, as at 13, or otherwise made of non-circular form to prevent relative rotation between said disks and the coupling member 9. Each series of laminations is held against one of the flanges 10 of the coupling member by a nut 14.

With this arrangement, assuming the driving shaft 1 to rotate in the direction of arrow A, power is supplied by the body member 3 to the periphery of the right hand disk 11 Fig. 1, then through the coupling member 9 to the left hand disk 11, which applies the power to the periphery of the left hand coupling member 3 and thereby transfers it to the driven shaft 2. The coupling member 9 floats, as it were, between the ends of the two shaft sections because the disks 11 are made up of thin laminations and are sufficiently flexible to permit slight relative movement of the parts. To further increase the flexibility the several laminations of each of the members 11 are provided with outwardly extending slots or openings 15 preferably arranged substantially on a tangent to the circumference of the shaft members, which form tangentially disposed spokes or arms 16 connecting solid or complete rings of metal in the inner and outer peripheries of said members 11. The several plates or laminations are so arranged in the coupling that the spokes 16 will be subjected to tension, as the metal is stronger in tension than in compression. For example in Fig. 2 which represents the left hand portion of Fig. 1, the central coupling member 9 is applying power to the inner ends of the spokes 16 which transmit said power by tension therein to the periphery of the disk. In the right hand flexible member 11, Fig. 1, the spokes 16 are inclined in the opposite direction because the power is applied first to the periphery of the disk and transmitted to its center.

By providing the several disk members with slots or openings, as described, they are made sufficiently flexible to enable them to be bent slightly out of their plane. Therefore, the driving and driven shaft sections may be located slightly out of line with each other or, if movable shafts, may move to a limited extent to an angular position relative to each other. Also, the two shafts may move slightly endwise toward and from each other.

The shaft coupling described may be used in multiple form as a flexible shaft, such, for example, as shown in Fig. 3. In this form of the invention two of the body portions of Fig. 1 are combined as a single member 3ª, the conical portions 7 of the same member flaring outwardly from each other. By utilizing one or a plurality of said combination members a series of any desired number of flexible members 11 may be connected to each other, thus providing for any desired deflection of direction of the shaft axes.

The invention may also be applied in the form shown in Fig. 4, where the floating coupling member 9ᵇ is a sleeve or cylinder of large diameter bolted or otherwise secured rigidly to the peripheral portion of the flexible disk members 11, the inner portions of the said disk members being attached directly to sleeve members 3ᵇ carried by the driving and driven shaft members 1 and 2. The operation of this form of the invention is exactly the same as before, the only difference from the form shown in Fig. 2 being that in Fig. 4 the power is applied to the center of the right hand flexible member and transmitted by the sleeve 9ᵇ to the periphery of the left hand flexible member. Both of the flexible members may of course, be slotted or provided with openings as before described.

This coupling provides for maximum flexibility of the shaft at minimum cost. There are no sliding parts to wear or get out of order and require replacement in a short time and lubrication is unnecessary. The flexible coupling disks can be maintained in service even if one or several of the laminations break, and even if wholly destroyed the flexible disks can be readily renewed at a cost of but a few cents.

What I claim is:

1. A shaft coupling, comprising body portions adapted to be secured to two shaft sections, a coupling member, and flexible members connecting said body portions and coupling member and provided with outwardly extending slots or openings forming tangentially disposed tension members.

2. A shaft coupling, comprising body portions adapted to be secured to two shaft sections, a coupling member, and flexible members connecting said body portions and coupling member and provided with outwardly extending slots or openings forming tangentially disposed tension members, said members being inclined in opposite direction on the two flexible members.

3. A shaft coupling, comprising body portions adapted to be secured to two shaft sections, a coupling member, and flexible members provided at intervals with slots or openings forming arms connecting sets of inner and outer rings, one of said sets of rings being connected to said body portions, and the other of said sets of rings being connected to the coupling member.

4. A shaft coupling, comprising body portions adapted to be secured to two shaft sections, a coupling member, flexible members provided at intervals with slots or openings closed at both ends and forming arms connecting sets of inner and outer rings, the outer set of rings being connected to said body portions, and the inner set of rings being connected to said coupling member.

5. A shaft coupling, comprising body portions adapted to be secured to two shaft sections, a coupling member, flexible members provided at intervals with slots or openings closed at both ends and forming arms connecting sets of inner and outer rings, the outer set of rings being connected to said body portions, and the inner set of rings being connected to said coupling member, said arms extending substantially tangentially to said inner rings.

6. A shaft coupling, comprising body portions adapted to be secured to two shaft sections, a coupling member, flexible members provided at intervals with slots or openings closed at both ends and forming arms connecting sets of inner and outer rings, the outer set of rings being connected to said body portions, and the inner set of rings being connected to said coupling member, said arms extending substantially tangentially to said inner rings, the arms in the flexible member being inclined in opposite directions circumferentially to said rings.

In testimony whereof I have hereunto affixed my signature.

STEPHEN JENCICK.